(12) United States Patent
Cao et al.

(10) Patent No.: US 7,870,509 B2
(45) Date of Patent: Jan. 11, 2011

(54) METHOD AND APPARATUS FOR IMPROVING THE VISIBILITY OF A TREEMAP

(75) Inventors: Nan Cao, Shannxi Province (CN); Shixia Liu, ShangDi Beijing (CN); Hao Lu, Shanghai (CN); Xi Jun Ma, Beijing (CN); Martin Miles Wattenberg, Winchester, MA (US)

(73) Assignee: International Business Machines Corporation, Armonk, NY (US)

( * ) Notice: Subject to any disclaimer, the term of this patent is extended or adjusted under 35 U.S.C. 154(b) by 722 days.

(21) Appl. No.: 11/740,308

(22) Filed: Apr. 26, 2007

(65) Prior Publication Data

US 2008/0046816 A1 Feb. 21, 2008

(30) Foreign Application Priority Data

Apr. 28, 2006 (CN) ........................ 2006 1 0079019

(51) Int. Cl.
*G06F 3/00* (2006.01)
(52) U.S. Cl. ..................................... 715/853; 715/765
(58) Field of Classification Search ................ 715/764, 715/765, 810, 853, 854
See application file for complete search history.

(56) References Cited

U.S. PATENT DOCUMENTS

| 5,619,632 | A | * | 4/1997 | Lamping et al. ............ 345/441 |
|---|---|---|---|---|
| 5,701,467 | A | | 12/1997 | Freeston |
| 5,784,583 | A | | 7/1998 | Redpath |
| 6,104,400 | A | * | 8/2000 | Halachmi et al. ........... 715/854 |
| 6,285,366 | B1 | * | 9/2001 | Ng et al. ..................... 715/853 |
| 6,381,611 | B1 | | 4/2002 | Roberge et al. |
| 6,496,208 | B1 | * | 12/2002 | Bernhardt et al. ........... 715/853 |
| 7,392,488 | B2 | * | 6/2008 | Card et al. .................. 715/853 |
| 7,620,913 | B2 | * | 11/2009 | Hida et al. .................. 715/853 |
| 2002/0033850 | A1 | * | 3/2002 | Bates et al. ................. 345/853 |
| 2002/0191034 | A1 | * | 12/2002 | Sowizral et al. ............ 345/854 |
| 2003/0050906 | A1 | * | 3/2003 | Clifton-Bligh ................ 707/1 |
| 2004/0083196 | A1 | | 4/2004 | Reasor et al. |
| 2005/0138160 | A1 | | 6/2005 | Klein et al. |
| 2005/0273758 | A1 | | 12/2005 | Long |
| 2006/0212833 | A1 | * | 9/2006 | Gallagher et al. ........... 715/848 |

FOREIGN PATENT DOCUMENTS

KR 20020066836 A 8/2002

* cited by examiner

*Primary Examiner*—X. L Bautista
(74) *Attorney, Agent, or Firm*—Steven L. Nichols; Van Cott, Bagley, Cornwell & McCarthy P.C.

(57) ABSTRACT

The visibility of a treemap is improved by offsetting the area of a parent node relative to a bounding box containing all of its child nodes while constructing the treemap, so that a part of the bounding box lies outside the area of the parent node, and the area of each child node in the bounding box is located entirely or partially within the area of the parent node. The present invention highlights the parent-child relationships in the treemap with a cascading effect to make the structural information therein more apparent and easier to recognize.

20 Claims, 8 Drawing Sheets

| | |
|---|---|
| 11250 | ./Algorithms and Complexity |
| 4428 | Lab1 |
| 37 | Settings |
| 6692 | Project files |
| 17 | /Artificial Neural Networks |
| 17 | Lab1 |
| 202 | ./Bio informations |
| 10998 | ./CPP |
| 6927 | Lab2 |
| 947 | ./Economy |

FIG. 1

- Algorithms and Complexity
  - Lab1
    - Settings
    - Project files
  - Artificial Neural Networks
    - Lab1
  - Bio informations
  - CPP
    - Lab2
  - Economy

FIG. 2

METHOD AND APPARATUS FOR IMPROVING THE VISIBILITY OF A TREEMAP

TECHNICAL FIELD

The present invention relates to the field of data processing, and particularly to a method for improving the visibility of a treemap and a method and system for constructing a treemap with improved visibility by utilizing the above method.

BACKGROUND OF THE INVENTION

Along with the development of information technology, various hierarchical data can be found in a wide variety of database-related applications that are coming forth increasingly, including forums, mailing lists, business organization charts, content management categories, and product categories. Hierarchies, also known as tree structures, are collections of multiple data nodes where each node has a single parent, and zero or more children (with the exception of the root node, which has no parent). Hierarchical data contains two kinds of information: the structural information pertinent to the hierarchical structure, and the content information pertinent to every node.

The traditional way of visualizing hierarchical data can be roughly classified into three categories: listings, outlines, and tree diagrams.

A listing is generally good at presenting contents of hierarchical data, but cannot well reflect the structural information. Although the disadvantage may be compensated by displaying the locations in the hierarchy next to the items in a listing, it is not an ideal solution since it requires that users themselves parse the path information of the items in the listing.

An outline, being a trade-off between a listing and a tree diagram, summarizes the contents of the items in the listing, showing the structural locations of the items by indentation. A schematic drawing of a file folder hierarchy is shown in FIG. 1.

Lastly, a tree diagram is the most common method for displaying hierarchical data sets that contain more than a few nodes. Icons are used to represent the nodes of the hierarchical data sets in a tree diagram. Moreover, each node can be expanded or collapsed to show or hide its child nodes. A typical tree diagram is the directory tree in a file manager. A tree diagram is inferior to the other two methods in presenting contents, but is much more efficient in presenting the structural information FIG. 2 shows a tree diagram corresponding to the schematic drawing in FIG. 1.

As stated above, all of the three traditional methods have their respective benefits and drawbacks. However, they all share the property of presenting defective structural layouts for very large hierarchical data sets. This is because the size of the display area required by these methods to present hierarchical data will be in direct proportion to the number of the nodes in the hierarchy, and thus the bigger the hierarchical data set is, the larger the display space required by the entire structural layout. A small screen cannot fulfill the requirement of the entire display space of an enormous structural layout. Another problem with tree diagrams is horizontal scrolling. In particular in the case of a small screen, when all of the nodes in a hierarchy are expanded, the tree will become too wide to fit the size of the screen, so that the problem of navigation error in the hierarchy is very likely to arise when the user performs horizontal scrolling on the screen.

To overcome the shortcomings of the traditional visualization techniques, many methods have been proposed to visualize hierarchical data. Among these methods, treemaps have been receiving more and more attention.

A treemap is a method of space-constrained visualization of hierarchical data. It divides the display space into a set of rectangular bounding boxes representing the tree, and uses size and color information to represent the attributes of leaf nodes. A treemap enables users to compare nodes and subtrees at varying depth in the tree, thereby helping them recognize the entire structural information of the tree. Treemaps were first proposed by Ben Shneiderman during the 1990s, and they are originally designed for visualizing files on a hard drive. The concept of treemaps is described in detail in the article "Tree-maps: A Space-Filling Approach to the Visualization of Hierarchical Information Structures" (Proc. IEEE Visualization '91, IEEE, Piscataway, N.J. (1991), 284-291) by Brian Johnson and Ben Shneiderman.

A treemap has good scalability, and even may be used for presenting an enormous hierarchy having millions of items on a single screen. Therefore treemaps are now applied to a wide variety of domains ranging from financial analysis to sports reporting. However, it's not easy to discern the entire structure of the hierarchical data in a traditional treemap, especially when the hierarchy is very deep, as the presentation of parent-child relationships in a treemap is not obvious and can even be hard to recognize. Since the entire structure is very important for gaining an overview of the hierarchical data, currently there are a plurality of solutions for such a problem, such as a 3D effect presentation of a treemap. However, the computing resources required by such solutions are excessive or the achieved effect is not ideal.

Therefore, there is a need for a method and apparatus for improving the visibility of a treemap, in order to promote further application of treemaps.

SUMMARY OF THE INVENTION

The present invention may be viewed as a method and apparatus for constructing a treemap with improved visibility, so as to visualize large amount of hierarchical data in a constrained space, while at the same time highlighting the parent-child relationships in the hierarchy, thereby making the entire structure easier to understand.

According to an aspect of the present invention, there is provided a method for improving the visibility of a treemap, comprising offsetting the area of a parent node relative to a bounding box containing all of its child nodes while constructing the treemap, so that a part of the bounding box lies outside the area of the parent node, and the area of each child node in the bounding box is located entirely or partially within the area of the parent node.

According to another aspect of the present invention, there is provided a method for constructing a treemap with improved visibility comprising, for each node from the root node to the leaf nodes in a specified hierarchy, calculating the corresponding area of the node in the treemap, arranging the corresponding area of the node in a specified treemap area based on the result of the calculating step, and if the current node is a parent node, then carrying out the above method for improving the visibility of a treemap for the corresponding area of the parent node and presenting the treemap with improved visibility on a specified display area.

According to still another aspect of the present invention, there is provided an apparatus for improving the visibility of a treemap. The apparatus includes an offset direction/distance determination module for determining the relative offset direction and distance of the area of the parent node relative to the bounding box containing the corresponding areas of all of its child nodes while constructing the treemap. The apparatus further includes an offset module for offsetting the corresponding area of the parent node relative to the bounding box based on the relative offset direction and distance determined by the offset direction/distance determination module, so that a part of the bounding box moves out of the area of the parent node, and the area of each child node in the bounding box is located entirely or partially within the area of the parent node.

According to yet another aspect of the present invention, there is provided a system for constructing a treemap with improved visibility. The system includes an area calculation module for calculating the corresponding area in the treemap for each node in a specified hierarchy, and an area arrangement module for arranging the corresponding area of each node in the hierarchy within the specified treemap area based on the calculation result of the area calculation module, the above apparatus for improving the visibility of a treemap, and a presentation module for presenting the treemap with improved visibility processed by the apparatus for improving the visibility of a treemap on the specified display area.

BRIEF DESCRIPTION OF THE DRAWINGS

It is believed that through the following detailed descriptions of the particular implementations of the present invention, when taken in conjunction with the drawings, the above-mentioned features, advantages, and objectives of the present invention will be better understood:

FIG. 1 shows a schematic drawing of a file folder hierarchy;

FIG. 2 shows a tree diagram corresponding to the schematic drawing in FIG. 1;

DETAILED DESCRIPTION OF THE INVENTION

A treemap maps hierarchical information into a two dimensional (2D) representation of rectangles in the fashion of space filling, and divides the display space into a set of rectangular bounding boxes representing the tree structure. A treemap provides the structural information implicitly, eliminating the need of depicting the internal nodes explicitly. In particular, a treemap divides the designated area into areas representing the top nodes in the hierarchy, and then divides each of the divisional areas recursively, and rotates the division direction by 90 degrees at each recursion. In addition, while performing the division, the treemap determines the size of the area assigned for each node based on the weight of each node. That is, an area representing a node containing more important information in the hierarchy is assigned more display space while an area representing a node containing relatively less important information is assigned less display space.

Figure 3:
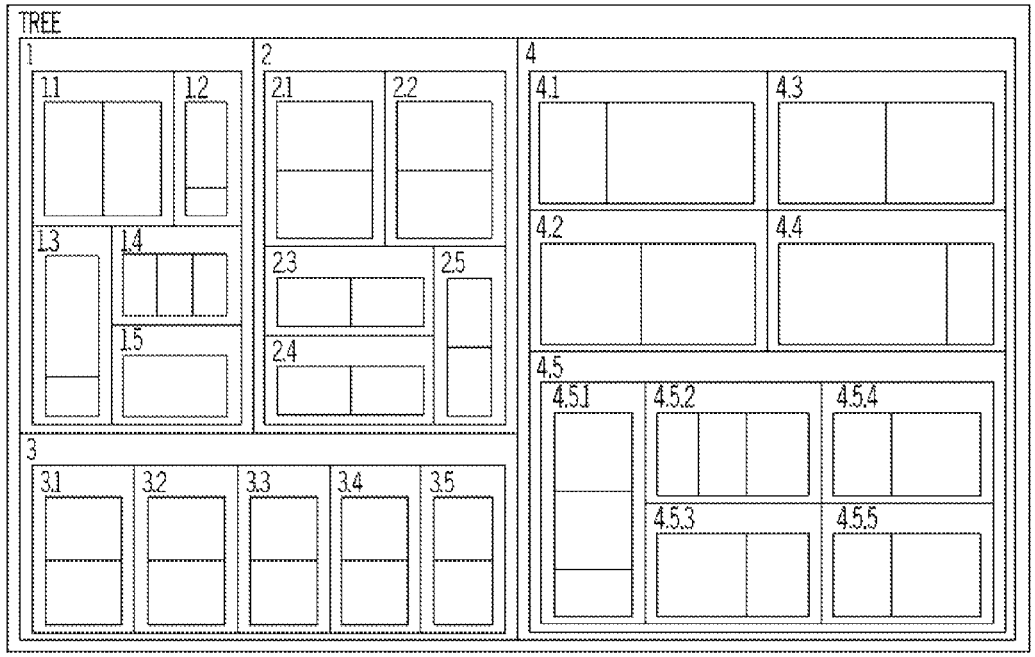
FIG. 3 shows an example of a treemap.

FIG. 3 shows an example of a treemap. As shown in FIG. 3, the root node of the tree in the treemap is named "Tree", which has four child nodes named "1", "2", "3" and "4" respectively, each of which further has its own child nodes. Child nodes are named following the index convention of book sections; for example a child node for node 4 could be named 4.1 The names of the leaf nodes are omitted in FIG. 3. It can be seen that a route such as <4.5.5, 4.5, 4, Tree> is hard to be recognize, and it is hard to get a clear overview of the original tree structure. In particular, when the number of nodes is in the thousands or the hierarchy is very deep (usually when the maximum depth of the hierarchy is greater than 3), this shortcoming of the treemap is more apparent. The treemap help users view the distribution of the leaf nodes without providing a clear overview of the entire hierarchy.

The present invention can be implemented as a method for constructing a treemap with improved visibility by taking advantage of the concept of 2.5D.

Figure 4:
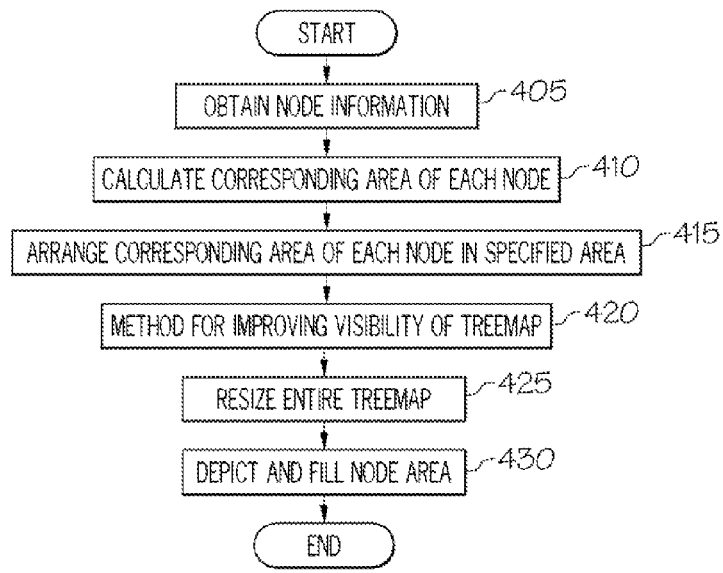
FIG. 4 is a flowchart showing a method for constructing a treemap with improved visibility according to an embodiment of the present invention.

FIG. 4 is a flowchart showing a method for constructing a treemap with improved visibility according to an embodiment of the present invention. As shown in FIG. 4, initially in step 405, for the specified hierarchy, the information of each node to be depicted on the specified area is obtained starting from the root node. The node information may include the weight, name, content, and other properties of the node.

In step 410, the corresponding area of each node is calculated based on the weight of each node obtained in step 405, i.e., the greater the weight of a node, the larger the space assigned to the node. The guidelines of this calculation step are: if a node is a parent node, then its corresponding area should be able to contain the corresponding areas of all its child nodes; and whether a node is a parent node or a child node, its corresponding area should not overlap that of its sibling node.

This calculation step may be perforated with an existing treemap layout algorithm. There are a plurality of available existing treemap layout algorithms, such as the splitting algorithm.

In step 415, the corresponding area of each node is arranged in the specified area. In this step, the precise location and size of the corresponding area of each node are calculated. This step may also be performed with existing treemap layout algorithms.

In the following, a treemap layout algorithm, originally described in the article "Tree-maps: A Space-Filling Approach to the Visualization of Hierarchical Information Structures" by Brian Johnson and Ben Shneiderman is given as reference:

```
DrawTree☐☐
{   doneSize=0;
    PaintDisplayRectangle( );
    switch (myOrientation ) {
        case HORIZONTAL:
            startSide=myBounds.left;
        case VERTICAL:
            startSide=myBounds.top;
```

-continued

```
        }
        if (myNodeType==Internal ) {
            ForEach(childNode) Do {
                childNode=SetBounds(startSide,doneSize,myOrientation);
                childNode->SetVisual( );
                childNode->DrawTree( );
    }}}
    SetBounds(startSide, doneSize, parentOrientation);
        { doneSize=doneSize+mySize;
        switch(parentOrientation) {
            case HORIZONTAL:
                myOrientation=VERTICAL;
                endSide=parentWidth+doneSize/parentSize;
                SetMyRect(startSide+offSet, ParentBounds.top+offset,
                    ParentBounds.left+endSide–offSet,
                    ParentBounds.bottom–offSet);
                StartSide=parentBounds.left+endSide;
            case VERTICAL:
                myOrientation=HORIZONTAL;
                endSide=parentHeight+doneSize/parentSize;
                SetThisRect(parentBounds.left+offSet, startSide+offSet,
                    parentBounds.right–offSet,
                    parentBounds.top+endSide–offSet);
                startSide=parentBounds.top+endSide;
}}
```

It can be seen from the above algorithm that the calculation, arrangement, and presentation of the corresponding area of each node are carried out in combination. The layout of the entire hierarchy is achieved by invoking this algorithm recursively. It is also the case in this embodiment, in which the above calculation step and the arrangement step are carried out in combination.

A difference between the method for constructing a treemap with improved visibility of the present embodiment and the above existing algorithms lies in the following steps.

In step 420, a method for improving the visibility of a treemap is performed for the corresponding areas of parent nodes (non-leaf nodes) in the treemap layout formed in step 415. The goal of this step is to make the corresponding areas of all parent nodes and those of their child nodes in the generated treemap have a cascading effect to highlight the parent-child relationships, thereby improving the visibility of the treemap.

In particular, in this step, it is determined one by one whether the current node is a parent node, i.e. a non-leaf node, starting from the root node of the above hierarchy. If the current node is a parent node, a method for improving the visibility of a treemap is carried out for the corresponding area of the node in the treemap layout formed above. The process proceeds until the method for improving the visibility of a treemap has been carried out for the corresponding areas of all non-leaf nodes in the above layout.

The method for improving the visibility of a treemap of the present invention is described in detail in the following, taken in conjunction with the accompanying figures.

Figure 5:
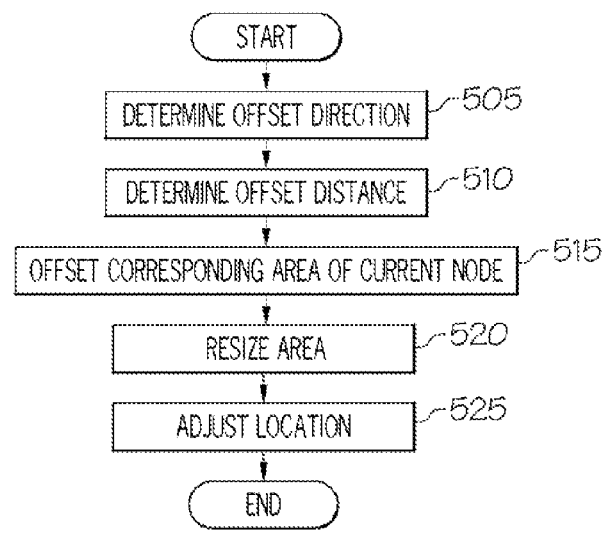
FIG. 5 is a flowchart showing a method for improving the visibility of a treemap according to one embodiment of the present invention.

FIG. 5 is a flowchart showing a method for improving the visibility of a treemap according to one embodiment of the present invention. As shown in FIG. 5, in step 505, an offset direction is determined. In general, the offset direction is pre-determined, and may be an arbitrary direction. In order to achieve the best effect contemplated in the present invention, however, the offset direction is set in the direction toward top-left. That is, the offset direction is composed of a horizontal offset direction component and a vertical offset direction component.

Then, in step 510, the offset distance is determined. In this step, the offset distance in the horizontal offset direction and the offset distance in the vertical offset direction are to be determined. In one embodiment, the offset distance in the horizontal offset direction and the offset distance in the vertical offset direction are predetermined constants. In another embodiment, the offset distance in the horizontal offset direction and the offset distance in the vertical offset direction are pre-determined values that decrease linearly as the depth of nodes increase. In still another embodiment, the offset distance in the horizontal offset direction and the offset distance in the vertical offset direction are values that vary non-linearly with the depth of nodes. In the latter two cases, the corresponding offset distance is determined based on the depth of the current parent node in the hierarchy. That the offset distance varies with the depth of nodes is quite useful for obtaining a variety of useful 2.5D effects of the treemap and the improved visibility of the treemap.

Figure 6:
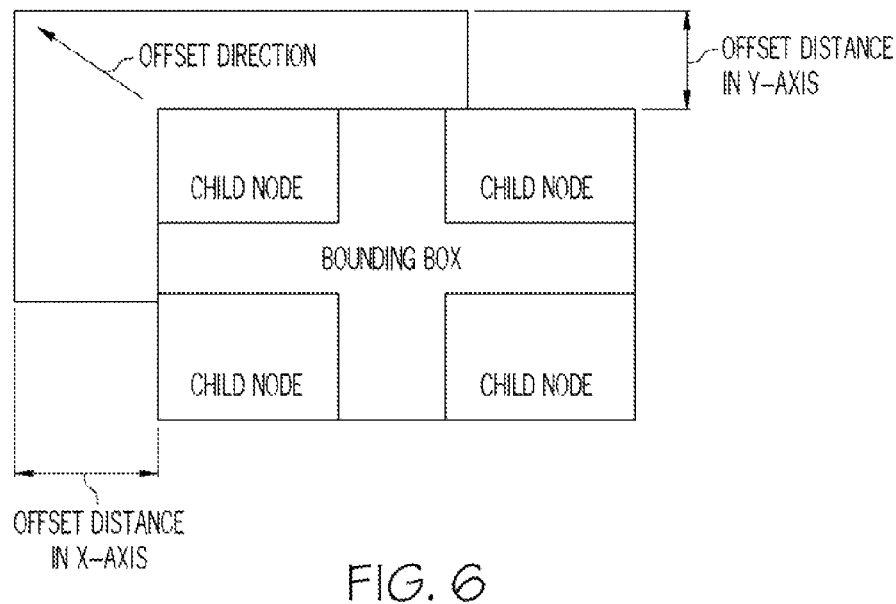
FIG. 6 schematically illustrates the offset operation in the method of FIG. 5.

In step 515, the corresponding area of the current parent node is offset. FIG. 6 schematically illustrates the offset operation. In particular, in this step, the corresponding area of the current parent node is offset in the offset direction, e.g., the top-left direction, relative to the bounding box containing the areas of all of its child nodes, according to the offset distance determined in step 510, until the relative distance between the area of the current parent node and the bounding box reaches the offset distance. That is, the relative distance in the horizontal direction between the area of the current parent node and the bounding box reaches the determined horizontal offset distance, and the relative distance in the vertical direction between the area of the current parent node and the bounding box reaches the determined vertical offset distance, thereby forming a cascading effect between the area of the current parent node and the areas of its child nodes.

The bounding box concept is widely used in the art. In particular, in order to reduce the amount of calculation, while performing calculations such as graphical element intersecting, the convex hull of the graphical element, instead of the graphical elements themselves, is usually used for performing the calculation. The convex hull of a graphic is a convex area containing this graphic. The convex hull of a plane graphical element may be an area that can contain the plane graphical element, such as in the shape of a convex polygon, rectangle, circle, or any other shape. A bounding box applied in the field of treemaps is just such a special convex hull, which is a rectangle containing the corresponding areas of nodes on a two-dimensional plane. Its two sides are parallel to the two coordinate axes respectively, which can be expressed by two inequalities: $x_{min} \leq x \leq x_{max}$, $y_{min} \leq y \leq y_{max}$. Where x and y are the coordinates of the corresponding areas of nodes, the bounding box is a rectangle defined by $x_{min}$, $x_{max}$, $y_{min}$, $y_{max}$. The necessary and sufficient condition that two bounding boxes intersect is that they intersect in the direction of each coordinate axis. As it is relatively easy to determine the fact that two bounding boxes intersect, bounding boxes have become the most common convex hull.

It is quite simple to calculate the bounding box of a polygon or a polyhedron. By only traversing its all vertexes, it is possible to find out the maximum and minimum coordinate values of the polygon or the polyhedron in the direction of each coordinate axis, thereby determining the bounding box. The same method may also be used to calculate the bounding box for a geometric entity that has been approximated to a polygon or a polyhedron and contains curved lines or surfaces. For a general geometric form, its bounding box should be calculated based on its specific characters.

Figure 7:
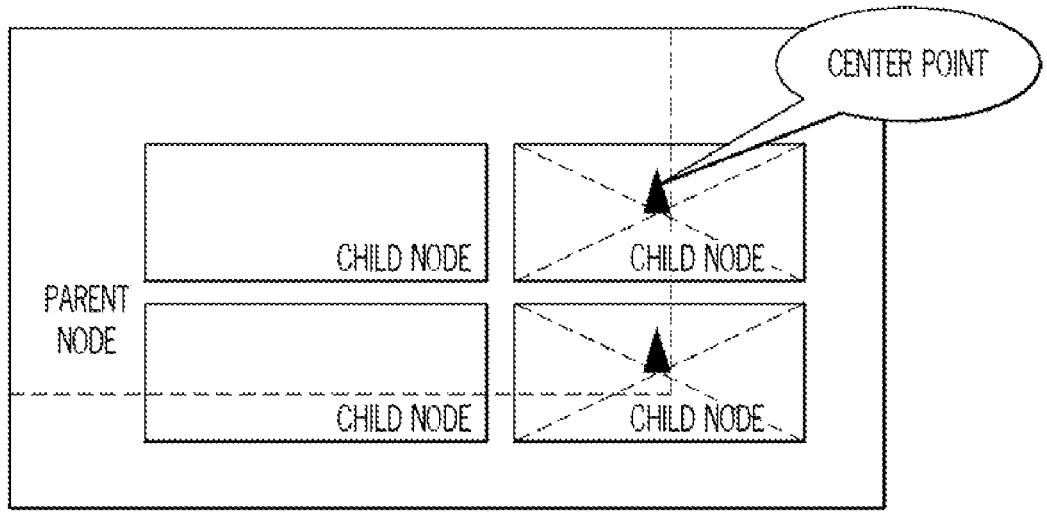
FIG. 7 schematically illustrates the region adjustment operation in the method of FIG. 5.

The area of the current parent node is resized in step 520. In this step, if the location of the top-left corner of the area of the current parent node remains fixed, the area is resized so that the area of each of its child nodes is located entirely or partially within the area of the current parent node, and the areas of the child nodes in the lowest row cross the lower bound of the area of the current parent node, while the areas of the child nodes at the rightmost column cross the right bound of the area of the current parent node. In the present embodiment, as shown in FIG. 7, the resizing step causes the area of the current parent node to cover the rightmost center point and the lowest center point of the areas of its child nodes.

The position is adjusted in step 525. As the area of the current parent node is offset and resized in step 515 and step 520, it might be overlapping the areas of other sibling nodes. Therefore, in this step, the position of the area of the current parent node is adjusted together with the positions of the areas of its child nodes so as to eliminate any overlap with other areas. Thus, there is only one node area behind the area of each non-root node, thus ensuring the correctness of the generated treemap.

The method for improving the visibility of a treemap in the present embodiment is described in detail above. Code for implementing the method is as follows.

```
public void tune(TreeRect cell) {
//1. Leaf nodes remain fixed
if (cell.childs == null) { //Leaf nodes, wherein cell.x1, cell.y1,
                          cell.x2, cell.y2 store the results of the preceding
                          layout, which are the locations of the top-left
                          corner and the bottom-right corner respectively
cell.setContent(cell.x1, cell.y1, cell.x2, cell.y2);
return;
}
int i;
//2. Adjust each child node
for (i = 0 ;i < cell.childs.length; ++i)
tune(cell.childs[i]);
//3. Adjust the current node after the adjusting of the child nodes is
completed. In particular, the position of the bottom-right corner of the
current node is adjusted, while the top-left corner remains fixed
double xx = cell.x1, yy = cell.y1;
double xc, yc;
for (i = 0; i < cell.childs.length; ++i) {
xc = cell.childs[i].cx1 / 4 + cell.childs[i].cx2 * 3 / 4;
yc = cell.childs[i].cy1 / 4 + cell.childs[i].cy2 * 3 / 4;
if (xc > xx)
xx = xc;
if (yc > yy)
yy = yc;
}
cell.setContent(cell.x1, cell.y1, xx, yy);
}
```

Figure 8:
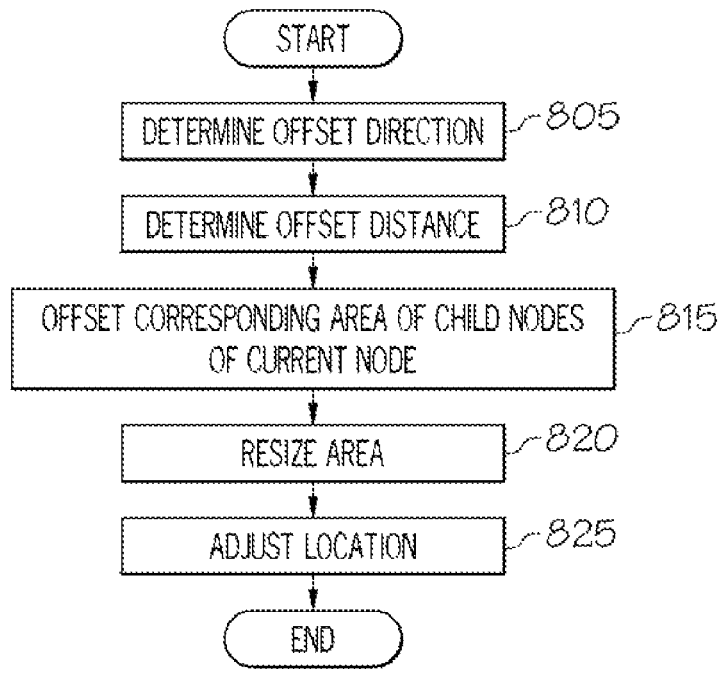
FIG. 8 is a flowchart, showing a method for improving the visibility of a treemap according to another embodiment of the present invention.

It should be noted that the area of the current parent node is offset with respect to that of its child node in the present embodiment. In other embodiments, as shown in step 815 of FIG. 8, it is also possible that the area of the child nodes are offset with respect to that of the parent node. In this case, the rectangle areas of the child nodes are preferably offset toward bottom-right with respect to that of the parent node. Of course, as long as the objectives of the present invention can be achieved, other offset ways are allowable and within the scope of the present invention.

Returning to FIG. 4, in step 425, the entire area of the formed treemap with improved visibility is resized to fit the size of the specified display area that will display the treemap.

Figure 9:
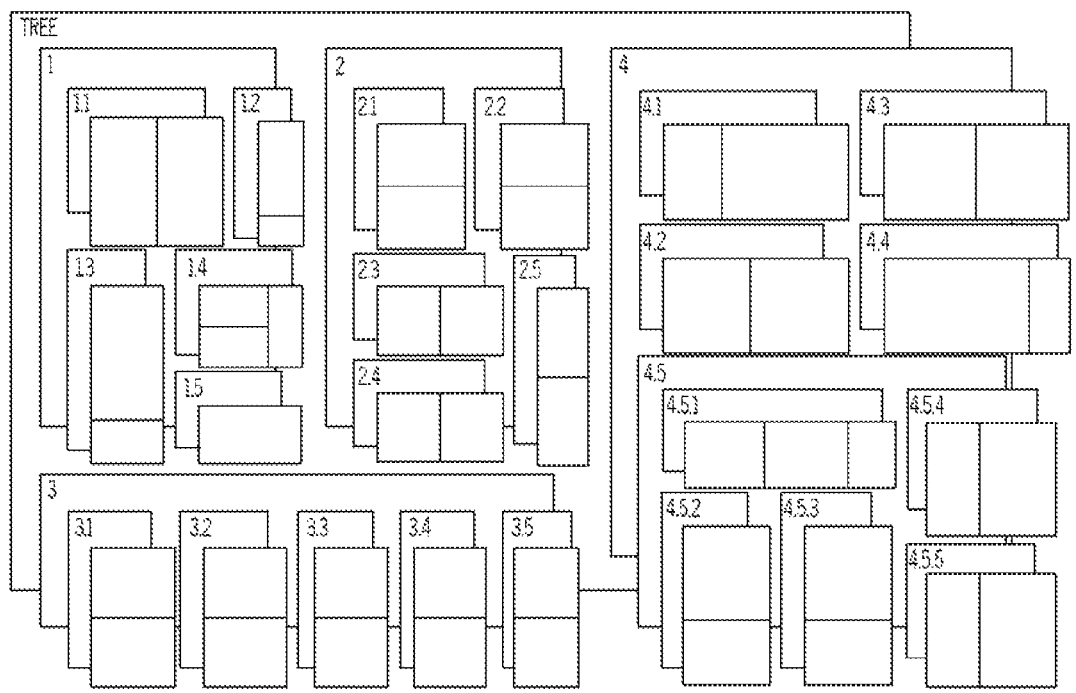
FIG. 9 shows an example of a treemap generated by the method for constructing a treemap with improved visibility according to one embodiment of the present invention.

In step 430, the node areas are depicted and filled. In this step, for the corresponding area of each node from the root node to the leaf node, the border is depicted, and the corresponding area is filled based on the depth of the node. In the present embodiment, the corresponding area of each node in the hierarchy is depicted with a rectangular border Furthermore, in the present embodiment, the corresponding areas of the nodes at different depth in the hierarchy are filled with different gray levels to highlight the depth information. This is very useful for improving the cascading effect practically. FIG. 9 shows an example of a treemap generated by the method of the present embodiment.

Figure 10:
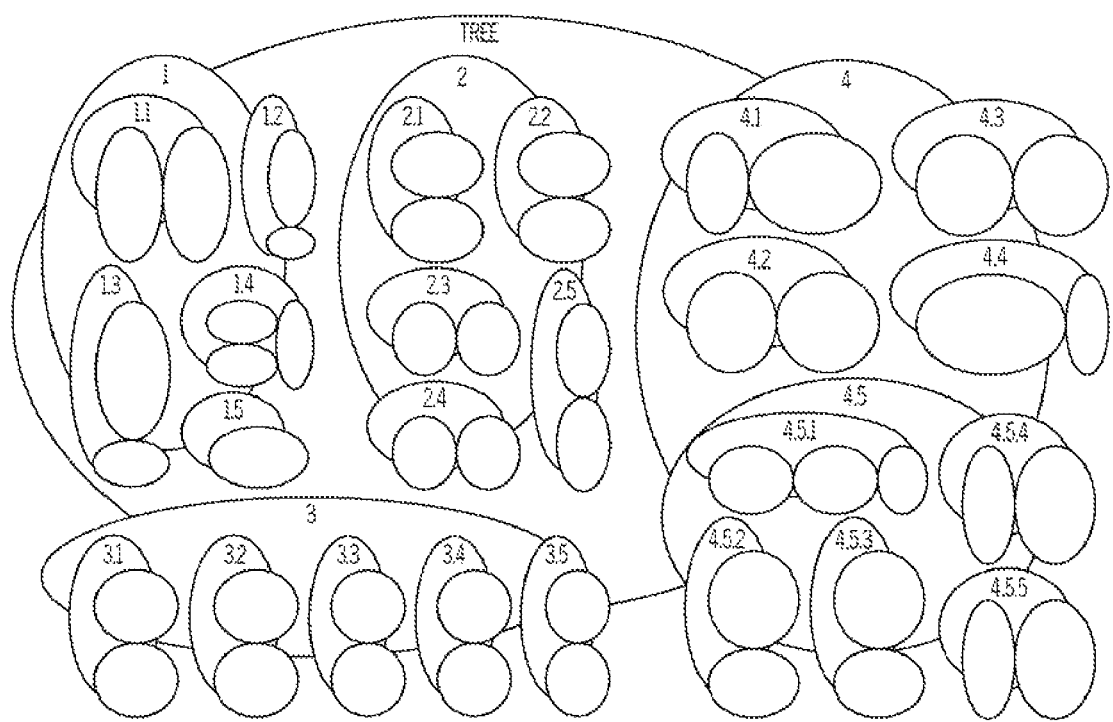
FIG. 10 shows an example of a treemap generated by the method for constructing a treemap with improved visibility according to another embodiment of the present invention.

In other embodiments, node areas may be depicted as shapes other than rectangles. FIG. 10 shows an example of a treemap generated according to another embodiment of the present invention, in which each node area is depicted with an elliptical border.

Figure 11:
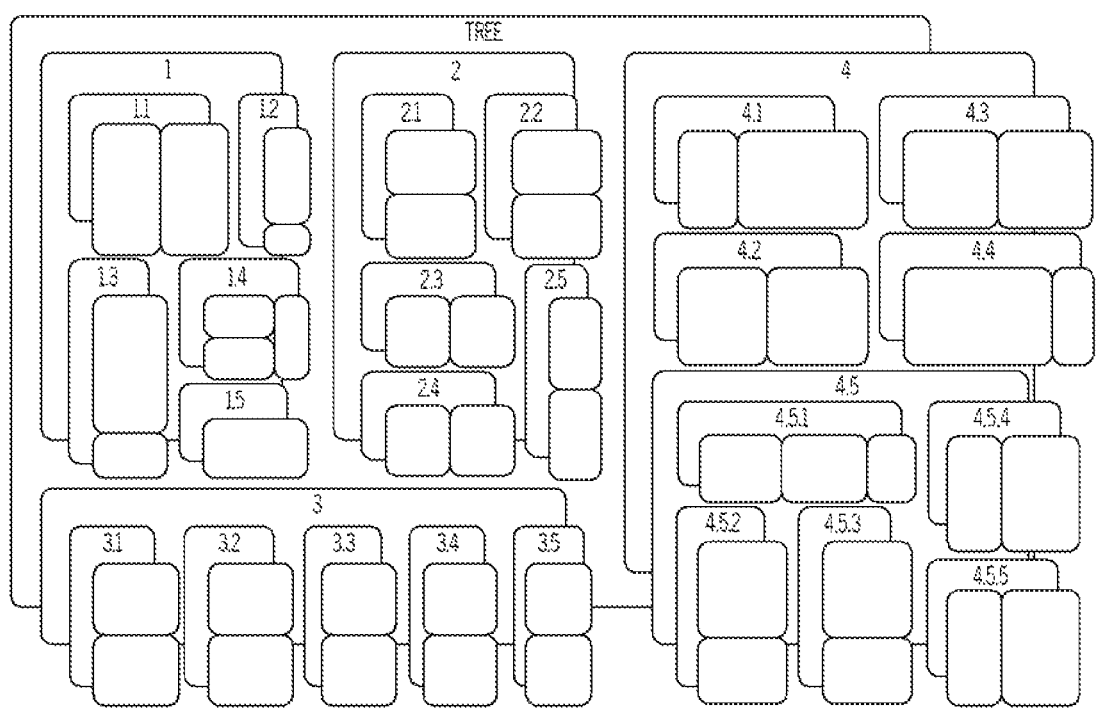
FIG. 11 shows an example of a treemap generated by the method for constructing a treemap with improved visibility according to still another embodiment of the present invention.

FIG. 11 shows an example of a treemap generated according to still another embodiment of the present invention, in which each node area is depicted with a round-cornered rectangular border. Moreover, the node areas may be depicted with polygonal borders. In addition, in other embodiments, the corresponding areas of the nodes at different depth can be filled with different colors.

It should be noted that the flowchart of FIG. 4 is only illustrative and would, in a practical implementation, be iteratively invoked in generating a treemap in accordance with the present invention.

In addition, in the present, embodiment, the steps of calculation, arrangement, visibility improvement, and presentation are described as separate steps only for ease of illustration of the present embodiment. In practical implementation, these steps may be combined to be carried out.

In addition, in other embodiments, in the arrangement step, the spacing between the area of the child nodes and that of the parent node is set to the offset distance in the present invention when the treemap is arranged by an existing treemap layout, algorithm, i.e. the top padding space between the area of the child nodes and that of the parent node is set to be the vertical offset distance in the present invention, and the left padding space between them is set to be the horizontal offset distance in the present invention.

Furthermore, it is to be noted that the hierarchies presented by the treemaps in FIGS. 9-11 are the same as the one presented by the traditional treemap in FIG. 3. But, it may be seen by comparison that the treemap generated by the present invention has a strong three dimensional (3D) effect even on a two dimensional display. The present invention produces a 3D-like effect by cascading the area of a parent node and the areas of its child nodes in the treemap, thereby enabling the viewer to get a strong feeling that the child nodes are in front of the parent node. Such feeling will greatly help the viewer understand the hierarchical relationship presented by the treemap. Thus, the present invention makes the hierarchical information more obvious and easier to be recognized while visualizing the hierarchy. For example, as shown in FIG. 9, the parent-child relationships are more obvious and easier to recognize due to the cascading effect, so that the route <4.5.5, 4.5, 4, Tree> becomes easy to recognize compared with the traditional treemap shown in FIG. 3.

Figure 12:
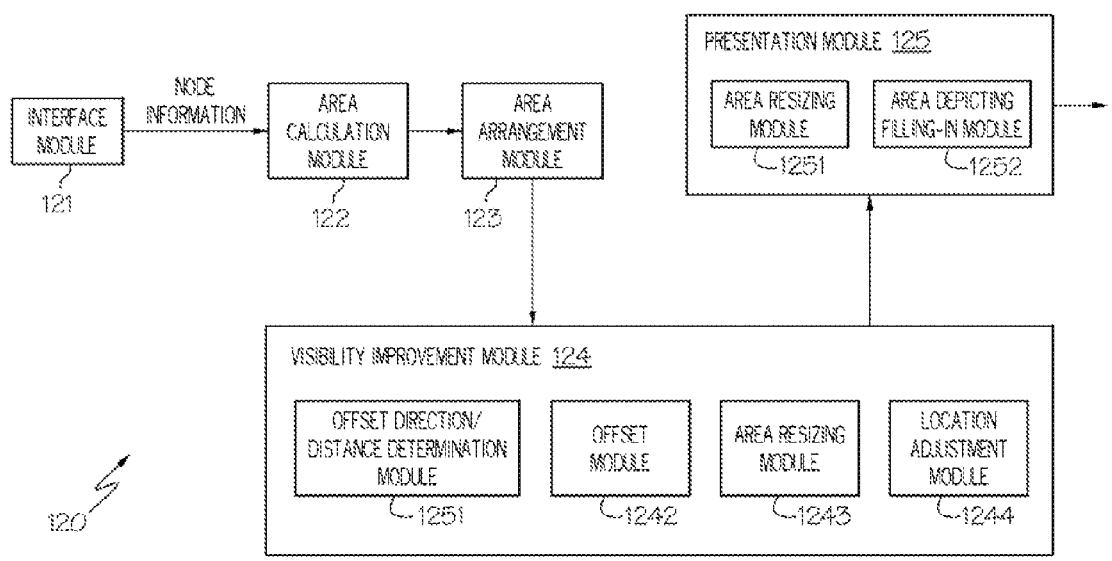
FIG. 12 is a block diagram showing a system for constructing a treemap with improved visibility according to an embodiment of the present invention.

FIG. 12 is a block diagram showing a system for constructing a treemap with improved visibility according to an embodiment of the present invention. As shown in FIG. 12, the system 120 comprises an interface module 121, an area calculation module 122, an area arrangement module 123, a visibility improvement module 124, and a presentation module 125.

The interface module 121 obtains from external source information about each node starting from the root node. The obtained information includes the weight, name, content, and possibly other properties of the node.

The area calculation module 122 calculates the corresponding area in the treemap for each node based on the information obtained by the interface module 121. The space assigned to a node is proportional to the weight of that node. In the area calculation module 122, the corresponding area calculated for a parent node contains the corresponding areas of all its child nodes. The corresponding area calculated for each node does not overlap those of its sibling nodes.

The area arrangement module 123 arranges the corresponding area of each node calculated by the area calculation module 122 within the specified treemap area. That is, the precise location and size of the corresponding area of each node in the treemap are determined Moreover, when arranging the corresponding area of each node, the area arrangement module 123 determines whether the current node is a parent node, i.e. a non-leaf node. If so, the visibility improvement module 124 is invoked for the current node.

It is to be noted that the area calculation module 122 and the area arrangement module 123 may be implemented with an existing treemap layout algorithm, such as the splitting algorithm.

The visibility improvement module 124 creates the cascading display of the corresponding areas of all parent nodes and the bounding boxes containing the areas of all of their child nodes to highlight the parent-child relationships.

As shown in FIG. 12, the visibility improvement module 124 comprises an offset direction/distance determination module 1241, an offset module 1242, an area resizing module 1243, and a location adjustment module 1244.

The offset direction/distance determination module 1241 determines the offset direction and distance of the area of the current parent node with respect to the bounding box containing the areas of all of its child nodes. In the present embodiment, the offset direction is preferably toward to the top-left, i.e. the offset direction comprises a horizontal offset direction component and a vertical offset direction component. In one embodiment, the offset distance in the horizontal offset direction and the offset distance in the vertical offset direction are both pre-determined constants. In another embodiment, the offset distance in the horizontal offset direction and the offset distance in the vertical offset direction are pre-determined values that decrease linearly with the increasing of the depth of nodes. In still another embodiment, the offset distance in the horizontal offset direction and the offset distance in the vertical offset direction are values that vary non-linearly with the depth of nodes.

The offset module 1242 offsets the corresponding area of the current node relative to the bounding box containing the areas of all of its child nodes based on the relative offset direction and distance determined by the offset direction/distance determination module 1241, so that the distance in the horizontal offset direction between the area of the current node and the bounding box reaches the determined horizontal offset distance, and the distance in the vertical offset direction between the area of the current node and the bounding box reaches the determined vertical offset distance, thereby forming a cascading effect between the area of the current node and the areas of its child nodes.

The area resizing module 1243 resizes the area of the current node. Where the location of the top-left corner of the area of the current node remains fixed, the area of each of its child nodes is located entirely or partially within the area of the current node, and the areas of the nodes at the lowest row cross the lower bound of the area of the current node, while the areas of the nodes at the rightmost column cross the right bound of the area of the current node. In particular, in the present embodiment, the area resizing module 1243 finds the rightmost center point and the lowest center point of the areas of the child nodes of the current node, and resizes the area of the current node to cover these center points.

The location adjustment module 1244 adjusts the position of the offset area of the current parent node together with the positions of the areas of its child nodes, so as to eliminate any overlap with the areas of other sibling nodes.

The presentation module 125 presents the constructed treemap on the specified display area. As shown in FIG. 12, the presentation module 125 further comprises an area resizing module 1251 and an area depicting/filling module 1252.

The area resizing module 1251 resizes the specified entire area of the treemap to fit the size of the specified display area. The area depicting/filling module 1252 depicts the corresponding area of each node with a border of a specific shape and fills the area based on the arrangement results of these areas by the visibility improvement module 124. In the present embodiment, these areas are depicted with rectangular borders. In other embodiments, however, these areas may be depicted as other shapes, such as polygons, ellipses, round-cornered rectangles, or the like. Moreover, in the present embodiment, the node shapes are filled with different gray levels based on the different depths of the nodes. In other embodiments, however, the corresponding areas of the nodes are filled with different colors based on the different depths of the nodes.

As those skilled in the art may have seen, the present invention may be embodied as a method or a system. Therefore, the present invention may be implemented in the form of entire hardware, the form of entire software, or the form of a combination of hardware and software.

In addition, the present invention may be provided as a computer program product having a computer-usable storage medium having computer-usable program code embodied therein. Any suitable computer-usable medium may be employed, including: hard drives, CD-ROMs, optical or magnetic storage devices. Furthermore, it is understood that each block in the block diagrams/flowcharts as well as a combination of some blocks in the block diagrams and flowcharts may be implemented with some computer program instructions. These computer program instructions may be provided to a general-purpose computer, a specialized computer, or the processor of another programmable data processing device to produce a machine, such that these instructions create means for implementing the functions specified in the block diagrams and/or flowcharts or the blocks through the execution thereof by the processor of the computer or another programmable data processing device.

Although a method and a system for improving the visibility of a treemap have been described in detail through some exemplary embodiments, these embodiments are not exhaustive. Those skilled in the art can make various variations therein and modifications within the spirit and scope of the present invention.

What is claimed is:

1. A method for improving the visibility of a treemap, comprising:

offsetting the area of a parent node relative to a bounding box containing all child nodes of the parent node while constructing the treemap, so that a part of the bounding box lies outside the area of the parent node, and the area of each child node in the bounding box is located entirely or partially within the area of the parent node.

2. A method for improving the visibility of a treemap according to claim 1, wherein the step of offsetting the area of the parent node relative to the bounding box further comprises offsetting the area of the parent node with respect to the bounding box.

3. A method for improving the visibility of a treemap according to claim 1, wherein the step of offsetting the area of the parent node relative to the bounding box further comprises offsetting the bounding box with respect to the area of the parent node.

4. A method for improving the visibility of a treemap according to either one of claims 2 and 3, wherein the offset direction of the area of the parent node or the bounding box comprises a component in horizontal offset direction and a component in vertical offset direction.

5. A method for improving the visibility of a treemap according to claim 4, wherein the step of offsetting the area of the parent node relative to the bounding box further comprises:
  determining the relative offset distance between the area of the parent node and the bounding box, wherein the relative offset distance comprises a component of the relative offset distance in the horizontal offset direction and a component of the relative offset distance in the vertical offset direction; and
  offsetting the area of the parent node relative to the bounding box based on the determined relative offset distance.

6. A method for improving the visibility of a treemap according to claim 4, wherein the offset distance in the horizontal offset direction and the offset distance in the vertical offset direction are constants.

7. A method for improving the visibility of a treemap according to claim 4, wherein the offset distance in the horizontal offset direction and the offset distance in the vertical offset direction are values that vary with the depth of the area of the parent node.

8. A method for improving the visibility of a treemap according to claim 1, further comprising resizing the area of the parent node to contain the entire or part of the area of each child node after offsetting the area of the parent node relative to the bounding box.

9. A method for improving the visibility of a treemap according to claim 1, further comprising adjusting the position of the area of the parent node together with the positions of the areas of its child nodes so as not to overlap the areas of other sibling nodes in the treemap after offsetting the area of the parent node relative to the bounding box.

10. A method for constructing a treemap with improved visibility, comprising:
  for each node from the root node to the leaf nodes in a specified hierarchy:
    calculating the corresponding area of the node in the treemap;
    arranging the corresponding area of the node in a specified treemap area based on the result of the calculating step; and
    for each parent node, offsetting the area of the parent node relative to a bounding box containing all child nodes of the parent node while constructing the treemap, so that a part of the bounding box lies outside the area of the parent node, and the area of each child node in the bounding box is located entirely or partially within the area of the parent node; and
  presenting the treemap with improved visibility on a specified display area.

11. A method for constructing a treemap with improved visibility according to claim 10, wherein the arranging step further comprises filling the corresponding areas of the nodes at different depths in the hierarchy with visually distinctive fills.

12. An apparatus for improving the visibility of a treemap, comprising:
  an offset direction and distance determination module for determining a relative offset direction and distance of an area of a parent node relative to a bounding box containing corresponding areas of all child nodes of the parent node while constructing the treemap; and
  an offset module for offsetting the area of the parent node relative to the bounding box based on the relative offset direction and distance determined by the offset direction/distance determination module, so that a part of the bounding box moves out of the area of the parent node, and the area of each child node in the bounding box is located entirely or partially within the area of the parent node.

13. An apparatus for improving the visibility of a treemap according to claim 12, further comprising an area resizing module for resizing the area of the parent node, after offsetting the corresponding area of the parent node relative to the bounding box, so as to contain the entire or part of the area of each child node.

14. An apparatus for improving the visibility of a treemap according to claim 12, further comprising an location adjustment module for adjusting the position of the area of the parent node together with the positions of the areas of its child nodes, after offsetting the corresponding area of the parent node relative to the bounding box, so as not to overlap the areas of other sibling nodes.

15. An apparatus for improving the visibility of a treemap according to claim 12 wherein the offset module makes one of the area of the parent node and the bounding box offset with respect to the other.

16. A computer program product comprising a computer-usable medium embodying program instructions that, when loaded onto and executed by a computer system, cause the system to perform a method for improving the visibility of a treemap, said method comprising the steps of
  offsetting the area of a parent node relative to a bounding box containing all child nodes of the parent node while constructing the treemap, so that a part of the bounding box lies outside the area of the parent node, and the area of each child node in the bounding box is located entirely or partially within the area of the parent node.

17. A computer program product according to claim 16 wherein the step of offsetting the area of the parent node relative to the bounding box further comprises offsetting the area of the parent node with respect to the bounding box.

18. A computer program product according to claim 17 wherein the step of offsetting the area of the parent node relative to the bounding box further comprises offsetting the bounding box with respect to the area of the parent node.

19. A computer program product according to either one of claims 17 and 18 wherein the offset direction of the area of the parent node or the bounding box comprises a component in horizontal offset direction and a component in vertical offset direction.

20. A computer program product according to claim 19 wherein the step of offsetting the area of the parent node relative to the bounding box further comprises:
  determining the relative offset distance between the area of the parent node and the bounding box, wherein the relative offset distance is composed of a component of the relative offset distance in the horizontal offset direction and a component of the relative offset distance in the vertical offset direction; and
  offsetting the area of the parent node relative to the bounding box based on the determined relative offset distance.

* * * * *